March 11, 1958  D. SANTINI ET AL  2,826,270
ELEVATOR CONTROL SYSTEM
Filed Oct. 22, 1956  8 Sheets-Sheet 1

March 11, 1958  D. SANTINI ET AL  2,826,270
ELEVATOR CONTROL SYSTEM
Filed Oct. 22, 1956  8 Sheets-Sheet 2

March 11, 1958  D. SANTINI ET AL  2,826,270
ELEVATOR CONTROL SYSTEM
Filed Oct. 22, 1956  8 Sheets-Sheet 4

United States Patent Office 2,826,270
Patented Mar. 11, 1958

2,826,270

ELEVATOR CONTROL SYSTEM

Danilo Santini, Tenafly, and John Suozzo, Paramus, N. J., assignors to Westinghouse Electric Corporation, East Pittsburgh, Pa., a corporation of Pennsylvania Application October 22, 1956, Serial No. 617,444

11 Claims. (Cl. 187—29)

This invention relates to elevator control systems and it has particular relation to elevator control systems for a plurality of elevator cars arranged in a bank and provided with dispatching equipment for controlling the dispatch of elevator cars from one or more dispatching floors.

The prior art discloses two major types of dispatching equipment. In one type the dispatching of elevator cars is controlled by factors such as the position and direction of elevator cars and the registration of calls calling for elevator service. A second type of dispatching equipment is time controlled for the purpose of establishing a time interval between the dispatching of each pair of successive elevator cars.

Although aspects of the invention are applicable to elevator systems employing each of the above-mentioned types of dispatching equipment, the invention is particularly desirable for elevator systems employing both types of dispatching equipment and will be described with reference to such a system. The invention further may be applied to an elevator system of the automatic type which does not require elevator car attendants, or it may be applied to an elevator system wherein attendants are provided in the elevator cars.

For efficient operation of an elevator system wherein a plurality of elevator cars are arranged in a bank, the elevator cars should be adequately spaced from each other. If the spacing of the elevator cars is lost and the elevator cars become bunched, the efficiency of the elevator system is decreased. Furthermore, an elevator car should not be permitted to stand idle at a terminal floor for an excessive period of time when its services are desired elsewhere.

In accordance with the invention, an elevator car must be in a zone of landings adjacent the terminal landing which it is approaching before a call for elevator service for a landing behind the elevator car is permitted to start a second elevator car towards the same terminal landing.

The invention also contemplates a modification of the dispatching interval in the event that an undesirably large number of elevator cars become set for travel in the same direction. In a preferred embodiment of the invention, dispatching equipment for establishing dispatching intervals for elevator cars is effective only in the presence of registration of certain calls for elevator service and is not effective in the presence of registration only of certain other calls for elevator service. Thus, dispatching equipment for controlling the dispatch of elevator cars from a lower terminal landing is not effective if only landing down calls are registered.

It is, therefore, an object of the invention to provide an improved elevator system wherein an elevator car is assumed to be at a terminal landing when it is in a zone of landings adjacent to the terminal landing.

It is another object of the invention to provide an improved elevator system wherein an elevator car must be in a zone of landings adjacent the terminal landing which it is approaching before call registration behind the elevator car can start a second elevator car from the other terminal landing.

It is also an object of the invention to provide an improved elevator system wherein a dispatching time interval is modified in the event that a large number of elevator cars are conditioned to travel in the same direction at the same time.

It is a further object of the invention to provide an improved elevator system wherein dispatching equipment of the time interval type is effective only in the presence of said time in all call registrations for elevator service.

Other objects of the invention will be apparent from the following description taken in conjunction with the accompanying drawings, in which:

Figs. 6, 7 and 8 are placed in side by side relationship respectively with Figs. 6A, 7A and 8A, the corresponding coils and contacts are substantially in horizontal alignment.

In order to simplify the presentation of the invention, the invention will be applied insofar as practical to the elevator system shown in the Keiper et al. Patent 2,597,-586 which issued May 20, 1952. Insofar as practical, the same reference characters will be employed to designate similar components in the patent and in the present patent application. In addition, the conventions set forth in the Keiper et al. patent will be followed as closely as practical.

The following relays and switches are shown in the aforesaid Keiper et al. patent and in the present patent application. For certain of the relays additional contacts may be provided as referred to below.

Switches and relays specific to car A:
    AU—Up switch
    AD—Down switch
    AV—Speed relay
    AM—Running relay
    AG—Inductor holding relay
    AE—Inductor slowdown relay
    AF—Inductor stopping relay
    AT—Car call stopping relay
    AJ—Reversing relay
    AS—Landing call stopping relay
    AW—Up relay
    AX—Down relay
    AK—Landing call above relay
    A14—High call reversal relay AH—Car call above relay
AI—Car call below relay
Relays common to all cars:
   1UR to 6UR—Landing up registering relays
   2DR to 7DR—Landing down registering relays
   1—"Up peak" relay
   2—"Down peak" relay
   5—Upper terminal "next" relay
   6—Lower terminal "next" relay
   K—Landing call relay In addition, the following relays are shown in the attached drawings:

Relays specific to car A:
   A12—Upper terminal relay
   A13—Lower terminal relay
   AL—Car call relay
   AXU—Upper zone relay
   AXD—Lower zone relay
   A931—Start up relay
   A941—Start down relay
   A70T—Delay relay
Relays common to all cars:
   100—Landing up call relay
   200—Landing down call relay
   UTA—Up timing relay
   DTA—Down timing relay

Figure 1:
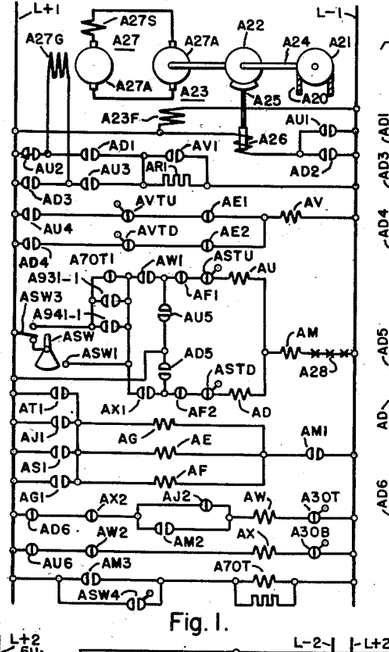
Figure 1 is a schematic view in straight line form, with parts shown in perspective and parts broken away, showing operating circuits for an elevator car.
Figure 1A:
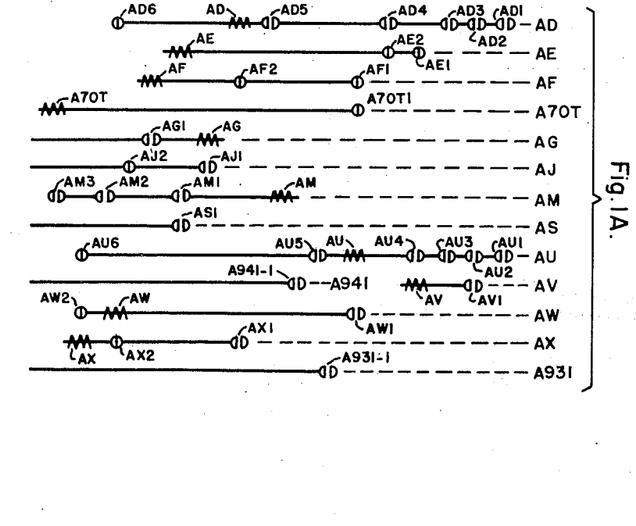
Fig. 1A is a schematic view of relays and contacts employed in the system of Fig. 1. The contacts and coils of the relays in Fig. 1A are in horizontal alignment with the corresponding contacts and coils in Fig. 1.

FIGURE 1

Fig. 1 is similar to Fig. 1 of the aforesaid Keiper et al. patent with the following exceptions.

In order to simplify the presentation, it will be assumed that the elevator car A when traveling down does not stop and reverse at a landing above the lower terminal landing. With this assumption, the contacts A13-1, the switch ATE and the contacts A13-2 and AM3 illustrated in Fig. 1 of the aforesaid Keiper et al. patent are not here required and are not reproduced for the same circuit. By inspection of Fig. 1 it will be observed that the down relay AX has its energization controlled only by the break contacts AU6 and AW2 and by the limit switch A30B. It will be recalled from the Keiper et al. patent that this limit switch is open only while the elevator car A is adjacent the lower terminal landing.

In addition, a delay relay A70T is provided which is energized by make contacts AM3 of the running relay AM and a switch ASW4 in parallel. The switch ASW4 is closed only while the elevator car A is at either of its terminal landings, in this case, the first and seventh landings. When deenergized the delay relay A70T has a substantial time delay in dropout which may be of the order of five seconds. This delay is measured at each of the intermediate landings at which the elevator stops for the purpose of providing adequate time for passengers to leave or enter the elevator car.

With the manually-operated single-pole double-throw switch ASW3 in the position illustrated in Fig. 1, the relays AU, AM and AD are controlled in precisely the same manner discussed in the aforesaid Keiper et al. patent. If the switch ASW3 is thrown to its remaining position, the system is arranged for automatic operation. Under these circumstances, closure of the break contacts A70T1, the make contacts A931-1 or the make contacts A941-1 completes a shunt across the switch ASW and its contact ASW1 to control the energization of the relays AU, AM and AD. The contacts A931-1 and A941-1 are associated respectively with a start up relay A931 and a start down relay A941 which control the starting of the elevator car at the upper and lower terminal landings.

It will be understood that each of the elevator cars B and C is controlled by circuits similar to those shown for the elevator car A.

Figure 2:
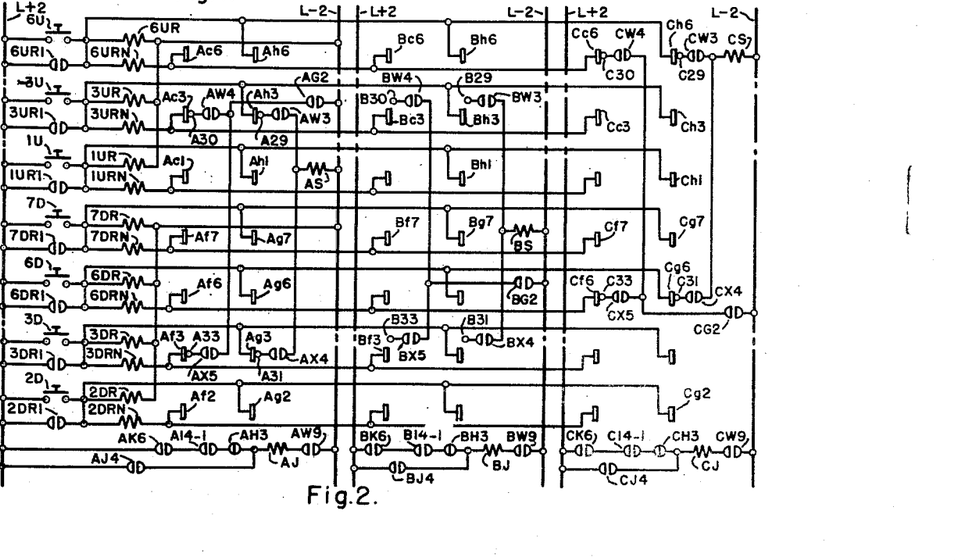
Fig. 2 is a schematic view in straight line form of landing call and other circuits suitable for an elevator system.

FIGURE 2

Fig. 2 is similar to Fig. 2 of the Keiper et al. patent; however, certain of the relays are provided with additional contacts which will be discussed below.

Figure 3:
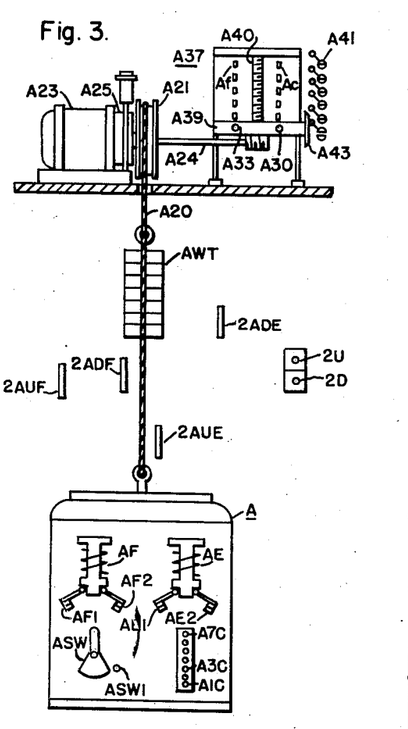
Fig. 3 is a view in elevation, with parts broken away, of elevator apparatus which may be employed in the system of Fig. 1.
Figure 4:
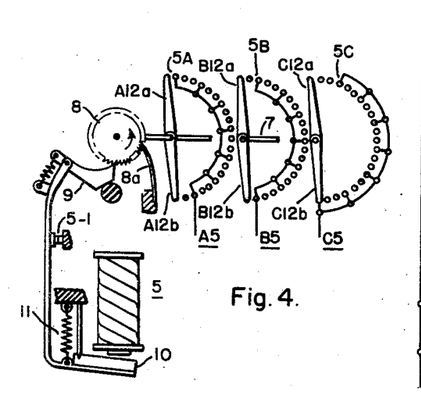
Fig. 4 is a schematic view of a stepping relay which may be employed in an elevator system embodying the invention.
Figure 5:
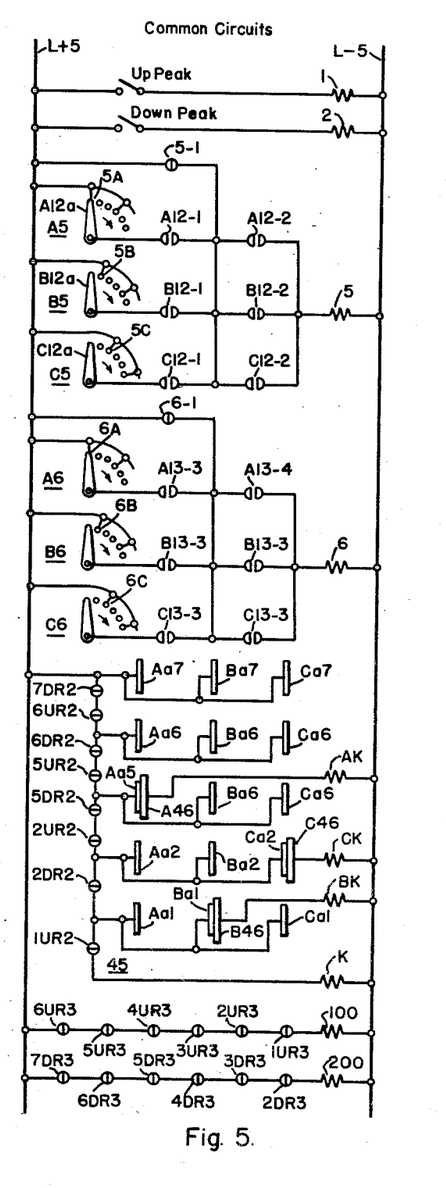
Fig. 5 is a schematic view in straight line form showing certain control circuits for the elevator system embodying the invention.

FIGURES 3, 4 AND 5

Figs. 3, 4 and 5 are similar to Figs. 3, 4 and 5 of the aforesaid Keiper et al. patent with a few exceptions. Consequently, a detailed description of these figures is not here required. The contacts on certain of the relays shown in Fig. 5 may be modified as discussed below. In addition, the construction of a row of contact segments on the selector A37 is modified as set forth below. Finally, two relays 100 and 200 are added. The landing up call relay 100 is connected across the direct-current buses L+5 and L—5 through break contacts 1UR3 to 6UR3 of the landing up registering relays 1UR to 6UR. The landing down call relay 200 is connected across the same buses in series with the break contacts 2DR3 to 7DR3 of the landing down registering relays 2DR to 7DR. Consequently registration of a landing up call deenergizes the relay 100 whereas registration of a landing down call deenergizes the relay 200.

Figure 6:
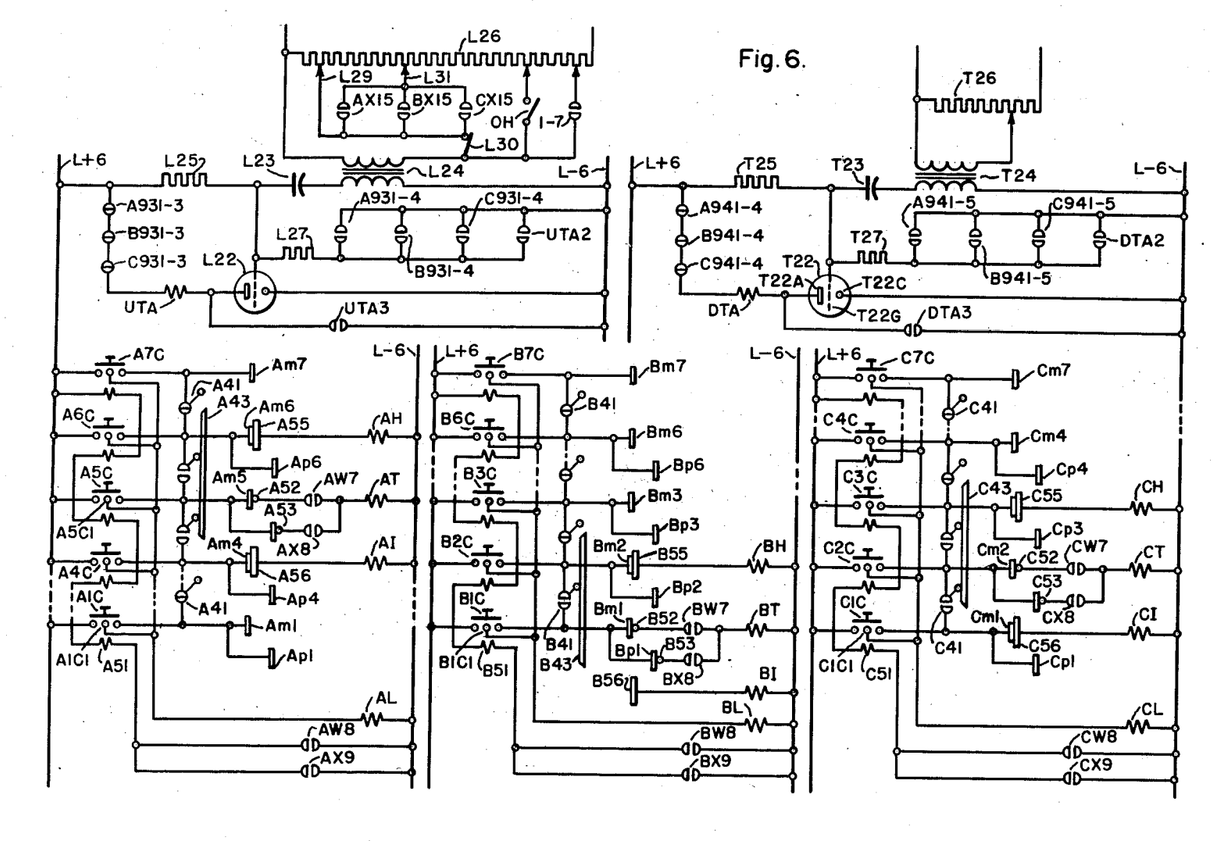
Figs. 6, 7 and 8 are schematic views in straight line form showing control circuits for an elevator system embodying the invention; and, Figs. 6A, 7A and 8A are schematic views of certain of the relays employed respectively in Figs. 6, 7 and 8. If
Figure 6A:
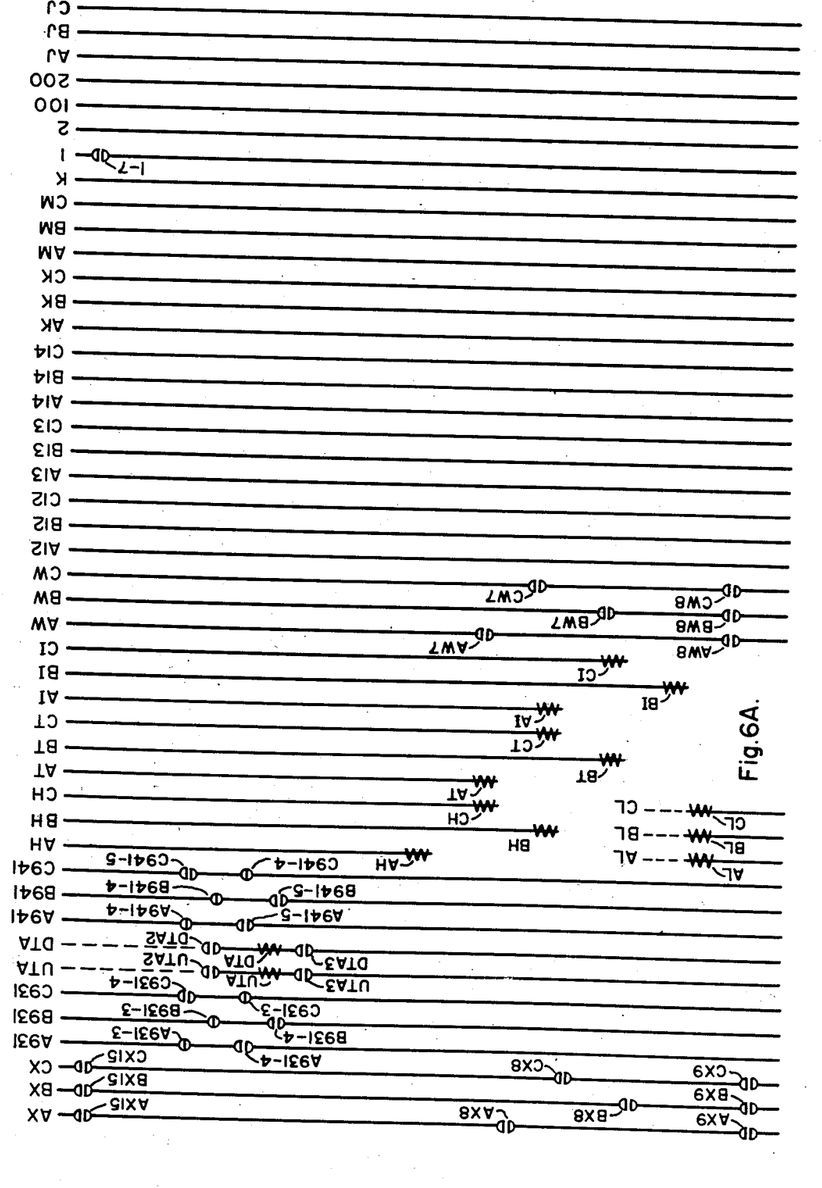

FIGURE 6

Fig. 6 shows the car buttons A1C to A7C and associated circuits which are similar to those shown in Fig. 6 of the aforesaid Keiper et al. patent with the following additions. By inspection of Fig. 6 it will be noted that each of the car buttons is provided with an additional contact A1C1 to A7C1, respectively. These additional contacts are all connected to one terminal of the car call relay AL, the remaining terminal of the relay being connected to the bus L—6.

By inspection of Fig. 6 it will be noted that operation of the button A1C for the first landing connects the contact A1C1 to the bus L+6 and consequently completes an energizing circuit for the car call relay AL. In a similar manner, operation of any of the car buttons for another landing results in energization of the car call relay AL.

The down timing relay DTA is connected in series with break contacts A941-4, B941-4 and C941-4 and with the anode T22A and cathode T22C of a control device T22 across the direct current buses L+6 and L—6. When the relay DTA picks up it closes its make contacts DTA3 to establish a holding circuit around control device T22.

The control device T22 may comprise any device suitable for control for the intended purpose. For example, it may be a hot-cathode or a cold-cathode electronic tube of the high vacuum or gaseous types. For present purposes, it will be assumed that the control device T22 is a cold-cathode gaseous discharge tube of the type commonly referred to as a thyratron.

The tube T22 has a control electrode T22G and the voltage appearing between the control electrode and the cathode T22C is equal to the sum of the voltages across a capacitor T23 and the secondary winding of a transformer T24. The secondary winding of the transformer and the capacitor are connected in series with a resistor T25 across the buses L+6 and L—6.

The transformer T24 has its primary winding connected across an adjustable portion of a voltage divider T26 and the voltage divider is connected to a suitable alternating current source which may have a frequency of 60 cycles per second.

In order to discharge the capacitor T23 a resistor T27 is connected across the capacitor T23 and the secondary winding of the transformer T24 through four sets of make contacts in parallel. These are the make contacts A941-5, B941-5, C941-5 and DTA2.

The operating sequence of the down timing relay DTA now will be considered. Let it be assumed that a suitable source of alternating current is connected across the voltage divider T26 and that the capacitor T23 is deenergized at the instant direct current voltage is applied to the buses L+6 and L—6. Under such circumstances, the capacitor starts to charge at a rate determined primarily by the magnitude of the resistor T25. It will be assumed further that the relays A941, B941, C941 and DTA are all deenergized and drop out. The voltage across the capacitor T23 builds up until the sum of this voltage and the alternating voltage appearing across the secondary winding of the transformer T24 is sufficient to fire the tube T22. Sufficient current now passes through the tube to pick up the relay DTA and this relay closes its make contacts DTA3 to establish a holding circuit around the tube T22. In addition, the make contacts DTA2 close to discharge the capacitor T23. Finally, make contacts DTA1, DTA4 and DTA5 all close to indicate that a dispatching interval has expired.

Let it be assumed that the closure of the make contacts DTA1 results in the starting of the elevator car A in the manner hereinafter described. Such starting is accompanied by pickup of the relay A941 and this relay opens its break contacts A941-4 to interrupt the energization of the relay DTA. In addition, make contacts A941-5 close to maintain the discharge circuit for the capacitor T23.

The dropout of the relay DTA is accompanied by opening of the make contacts DTA2, DTA3, DTA1, DTA4 and DTA5 without immediate effect on the operation of the system.

As the elevator car A leaves the upper terminal landing, the relay A941 is deenergized. This relay recloses its break contacts A941-4 without immediate effect on the operation of the system. However, the opening of the make contacts A941-5 interrupts the discharge circuit for the capacitor T23 and this capacitor starts to charge from the buses L+6 and L—6. After the expiration of a suitable dispatching interval the capacitor T23 again is charged to a value sufficient to fire the tube T22. This sequence is repeated during the operation of the elevator system. It will be understood that the length of the dispatching interval may be adjusted by adjusting the portion of the voltage divider T26 which is connected across the primary winding of the transformer T24.

In an analogous manner the up timing relay UTA is connected across the buses L+6 and L—6 through the break contacts A931-3, B931-3 and C931-3 and through the anode and cathode of a control device L22 which again may be in the form of a thyratron tube. Make contacts UTA3 of the relay UTA establish a holding circuit for the relay around the tube L22. The voltage across a capacitor L23 and the secondary winding of a transformer L24 in series is applied between the control electrode of the tube L22 and the cathode of the tube. The capacitor L23 is charged from buses L+6 and L—6 through the resistor L25 and the secondary winding of the transformer L24.

In order to discharge the capacitor L23 a resistor L27 is connected across the capacitor and the secondary winding of the transformer L24 through four sets of make contacts in parallel. These are the contacts A931-4, B931-4, C931-4 and UTA2.

If the switch L30 is closed the primary winding of the transformer L24 is connected to a tap L29 for the purpose of connecting the primary winding across an adjustable portion of the voltage divider L26. This voltage divider is connected to a suitable source of alternating current which may have a frequency of 60 cycles per second. Since the portions of the circuits associated with the up timing relay UTA are similar to those associated with the down timing relay DTA, the operation of the relay UTA will be understood from the previous discussion of the operation of the relay DTA.

The circuits associated with the up timing relay UTA includes provisions for automatically adjusting the dispatching interval measured by the relay UTA. To this end it will be noted that the switch L30 also connects the right hand terminal of the primary winding of the transformer L24 to an adjustable tap L31 on the voltage divider L26 through three sets of make contacts in parallel, namely the contacts AX15, BX15 and CX15. These contacts are operated respectively by the down relays AX, BX and CX of the elevator cars A, B and C.

If the elevator cars are properly distributed or spaced, at least one of the sets of make contacts AX15, BX15 and CX15 are closed to establish a shunt across a portion of the voltage divider. Since this increases the current flowing through the voltage divider, it follows that the voltage applied to the primary winding of the transformer L24 is increased. The increased voltage applied to the transformer L24 decreases the dispatching interval measured by the relay UTA.

Let it be assumed next that an abnormal spacing of the elevator cars results in a condition wherein all of the elevator cars are set up for travel. Under such conditions, all of the make contacts AX15, BX15 and CX15 are open and the voltage applied to the transformer L24 is reduced. Because of this reduction in voltage, a larger dispatching interval is measured by the relay UTA. This larger dispatching interval is effective for restoring the proper spacing of the elevator cars.

Under other conditions, other dispatching intervals may be desirable. For example, during off hours operation, such as those occurring during the night in an office building, a shorter dispatching interval may be desired. Such an interval may be obtained by opening the manually operated switch L30 and closing the manually operated switch OH to apply a larger voltage across the primary winding of the transformer L24. During up peak operation a still shorter dispatching interval may be desired and this may be obtained if the switches L30 and OH are open by closure of the make contacts 1—7 of the up peak relay to apply a still larger voltage across the primary winding of the transformer L24.

Figure 7:
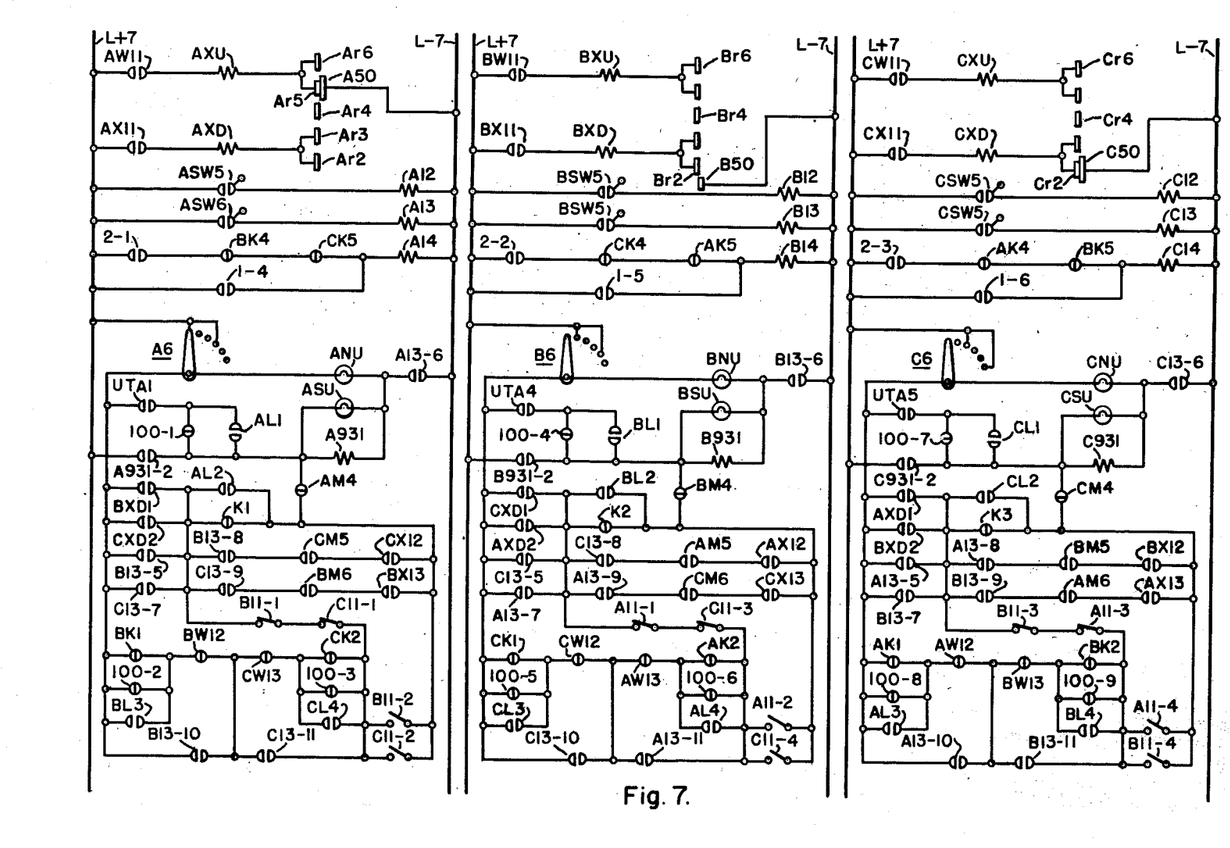
Figure 7A:
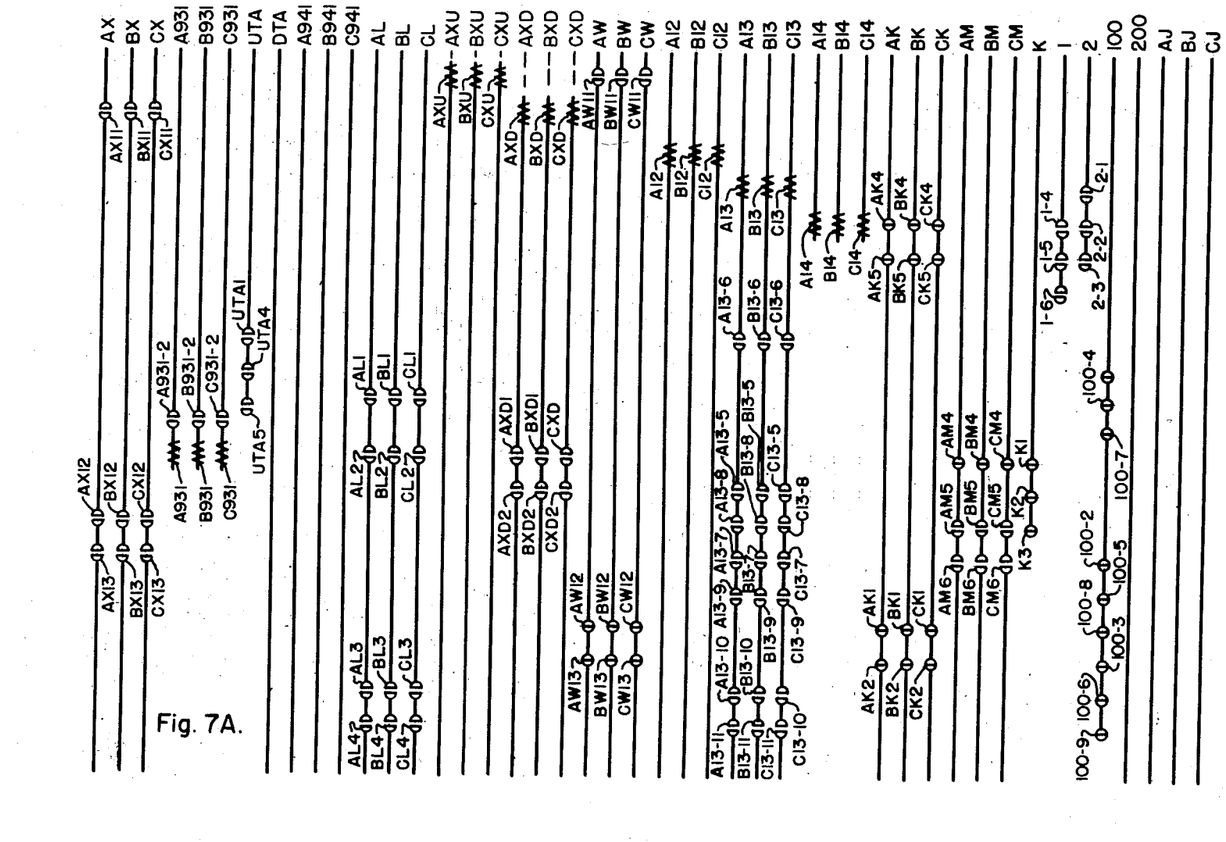

FIGURE 7

Energization and pickup of the upper zone relay AXU indicates that the elevator car A is in a zone of landings adjacent the upper terminal landing and is set for up travel. The number of landings to be included in the zone depends on the specific requirements of an elevator installation. For present purposes, it will be assumed that the upper zone includes the fifth and sixth landings.

By inspection of Fig. 7, it will be noted that the upper zone relay AXU is associated with contact segments located in a row of segments Ar2 to Ar6 which are provided in the selector A37 of Fig. 3. This row of contact segments has a brush A50 associated therewith for movement in accordance with movement of the elevator car A. The brush is connected to the bus L—7. One terminal of the upper zone relay AXU is connected to a contact segment for each of the landings included in the upper zone. For the assumed conditions the terminal of the relay is connected to the contact segments Ar5 and Ar6 for the fifth and sixth landings respectively. The remaining terminal of the relay is connected to the bus L+6 through make contacts AW11 which are operated by the up relay AW of Fig. 1.

The lower zone relay AXD when energized and picked up indicates that the elevator car A is in a lower zone of landings adjacent the lower terminal landing. The number of landings included in the zone depends on the requirements of each specific elevator installation. For present purposes it will be assumed that the second and third landings are included in the lower zone. One terminal of the relay AXD is connected to a contact segment for each of the landings in the lower zone, in this case the contact segments Ar2 and Ar3 for the second and third landings respectively. The remaining terminal of the lower zone relay AXD is connected to the bus L+6 through the make contacts AX11 which are operated by the down relay AX of Fig. 1.

Thus, if the elevator car A is set for up travel the make contacts AW11 are closed. If, at the same time, the elevator car is adjacent the fifth landing the brush A50 is in engagement with the contact segment Ar5 and completes with the make contacts AW11 an energizing circuit for the upper zone relay AXU.

If the elevator car A is set for down travel the make contacts AX11 are closed. If the elevator car A at the same time is adjacent the third landing the brush A50 is in engagement with the contact segment Ar3 to complete with the contacts AX11 an energizing circuit for the lower zone relay AXD.

The upper terminal relay A12 and the lower terminal relay A13 correspond respectively to the relays A12 and A13 of the aforesaid Keiper et al. patent. However, for present purposes, it is assumed that the upper terminal relay A12 is connected across the direct current buses L+7 and L−7 through a mechanically-operated switch ASW5 which is closed only when the elevator car A is at the upper terminal floor. The lower terminal relay A13 is connected across the buses L+7 and L−7 through a mechanically-operated switch ASW6 which is closed only when the elevator car A is at the lower terminal landing.

The high call reversal relay A14 is similar to that shown in the aforesaid Keiper et al. patent and is similarly energized.

When the elevator car A is at the lower terminal landing the make contacts A13–6 of the lower terminal relay A13 are closed. If at the same time the contact 6A of the stepping relay 6 has selected the elevator car A as the next elevator car to leave the lower terminal landing an energizing circuit for the lamp ANU is completed as follows:

L+6, A6, ANU, A13–6, L−6

The operation of the stepping relay 6 is similar to that set forth in the aforesaid Keiper et al. patent. When the lamp ANU is illuminated it indicates that the elevator car A should be loaded and that it will be the next elevator car to leave the lower terminal landing. The lamp ANU may be a floor lantern located at the lower terminal landing or it may be a lamp located in the elevator car A.

Let it be assumed that the elevator car A is at the lower terminal landing (make contacts A13–6 are closed) and that it is selected as the next car to leave the lower terminal landing. If a suitable dispatching interval has elapsed since the last elevator car left the lower terminal landing the make contacts UTA1 of the up timing relay close. If a car call is registered in the elevator car A the make contacts AL1 of the car call relay AL close. If a landing up call is registered from one of the landings the break contacts 100–1 of the landing up call relay 100 close. Thus, an energizing circuit is established for the lamp ASU as follows:

L+7, A6, UTA1, 100–1 or AL1, ASU, A13–6, L−7

The illumination of this lamp advises the car attendant, if one is used, that the elevator car is to start from or leave the lower terminal landing. It should be noted that if the only call for elevator service is a landing down call the contacts UTA1 are ineffective to start the elevator car A.

If the elevator car A is on automatic operation, energization of the start up relay A931 is utilized to start the elevator car. This relay is connected for energization at the same time as the lamp ASU. As shown in Fig. 7, the relay is connected in parallel with the lamp. When the relay A931 picks up it closes its make contacts A931–2 to establish with the contacts A13–6 a holding circuit for the relay. Thereafter, the relay remains picked up until the elevator car A leaves the lower terminal landing. Such departure of the elevator car results in opening of the make contacts A13–6 to deenergize the relay A931 and the lamp ASU.

If the elevator car A is at the lower terminal landing (make contacts A13–6 are closed), if the elevator car A is selected as the next elevator car to leave the lower terminal landing (contact A6 is connected to the bus L+7) and if the elevator car is stopped (break contacts AM4 are closed), a number of additional circuits are effective for controlling the energization of the lamp ASU and the relay A931. These circuits control the connection of one terminal of the contacts AM4 to the contacts A6 and are dependent on the positions of the cars, the direction of travel of the cars, the running condition of the cars and call registration. Because of the number of these circuits, they may be best described in tabular form. First, it will be assumed that all three of the elevator cars A, B and C are in operation. Under such circumstances, a starting circuit is completed if any one of the items A, B, C, D or E of Group I is satisfied and if in addition any one of the items A, B, C or D of Group II is satisfied in the following tabulation:

*Dispatching from lower terminal floor*

A. ALL THREE CARS ARE IN OPERATION

Group I:
    A. Car B is in lower terminal zone (make contacts BXD1 are closed)
    B. Car C is in lower terminal zone (make contacts CXD2 are closed)
    C. Car B is at lower terminal floor (make contacts B13–5 are closed)
    D. Car C is at lower terminal floor (make contacts C13–7 are closed)
    E. Cars B and C are both in service (switches B11–1 and C11–1 are closed with switches B11–2 and C11–2 open) and one item A or B in each of the following sub groups occurs:
      Sub Group 1—
        A. Car C is set for down travel (break contacts CW13 are closed) and any one of the following is also present: (*a*) A landing call is registered above the car C (break contacts CK2 are closed); (*b*) An up floor call is registered (break contacts 100–3 are closed); (*c*) A car call is registered in the car C (make contacts CL4 are closed).
        B. The car C is at the lower terminal floor (make contacts C13–11 are closed)
      Sub Group 2—
        A. The car B is set for down travel (break contacts BW12 are closed) and any one of the following is also present: (*a*) A landing call is registered above the car B (break contacts BK1 are closed); (*b*) An up floor call is registered (break contacts 100–2 are closed); (*c*) A car call is registered in the car B (make contacts BL3 are closed)
        B. The car B is at the lower terminal floor (make contacts B13–10 are closed)

Group II:
    A. The car A has a car call (make contacts AL2 are closed)
    B. A floor call is registered (break contacts K1 are closed)
    C. Car B is at the lower terminal floor (make contacts B13–8 are closed), car C is running (make contacts CM5 are closed) and car C is set for down travel (make contacts CX12 are closed)
    D. Car C is at the lower terminal floor (make contacts C13–9 are closed), car B is running (make contacts BM6 are closed) and car B is set for down travel (make contacts BX13 are closed)

If the elevator car B or the elevator car C is removed from service by opening of manually-operated switch B11-1 or C11-1 and, closure of manually-operated switch B11-2 or C11-2, the starting circuit for the elevator car A is completed if Sub Groups 1 and 2 under item E of Group I as above set forth are satisfied.

Figure 8:
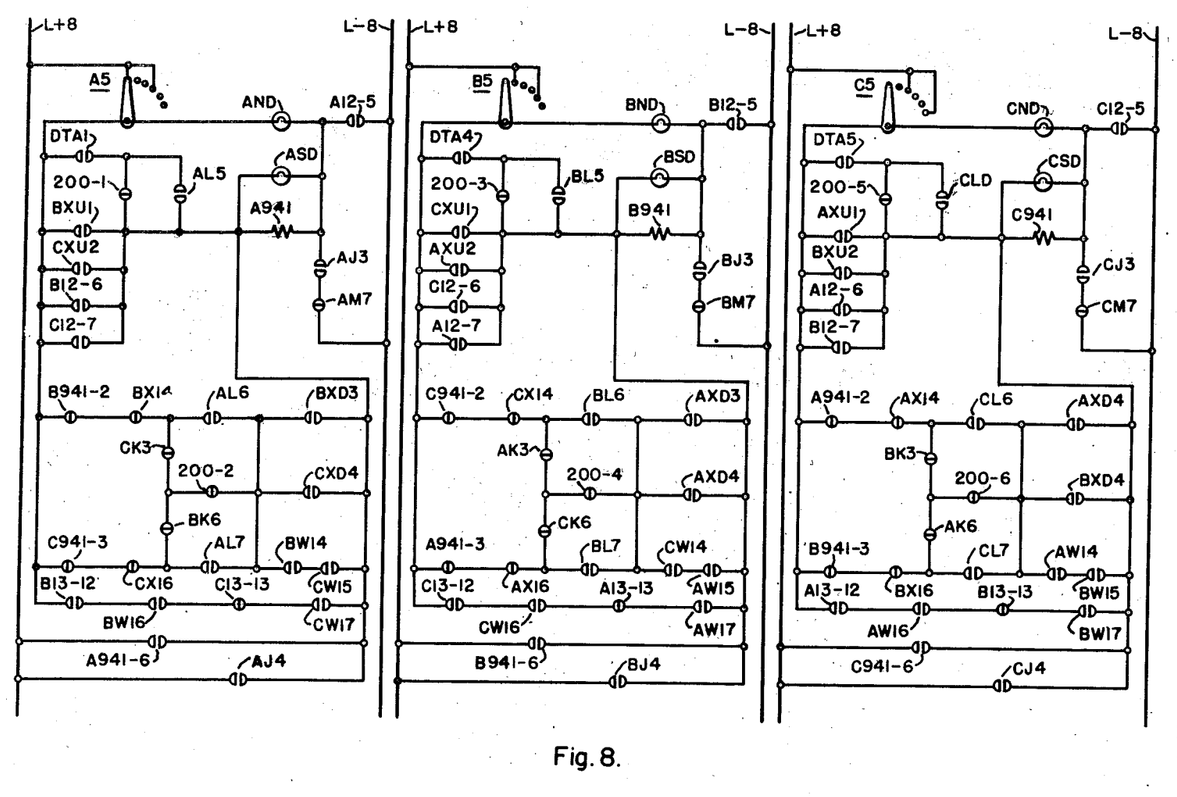
Figure 8A:
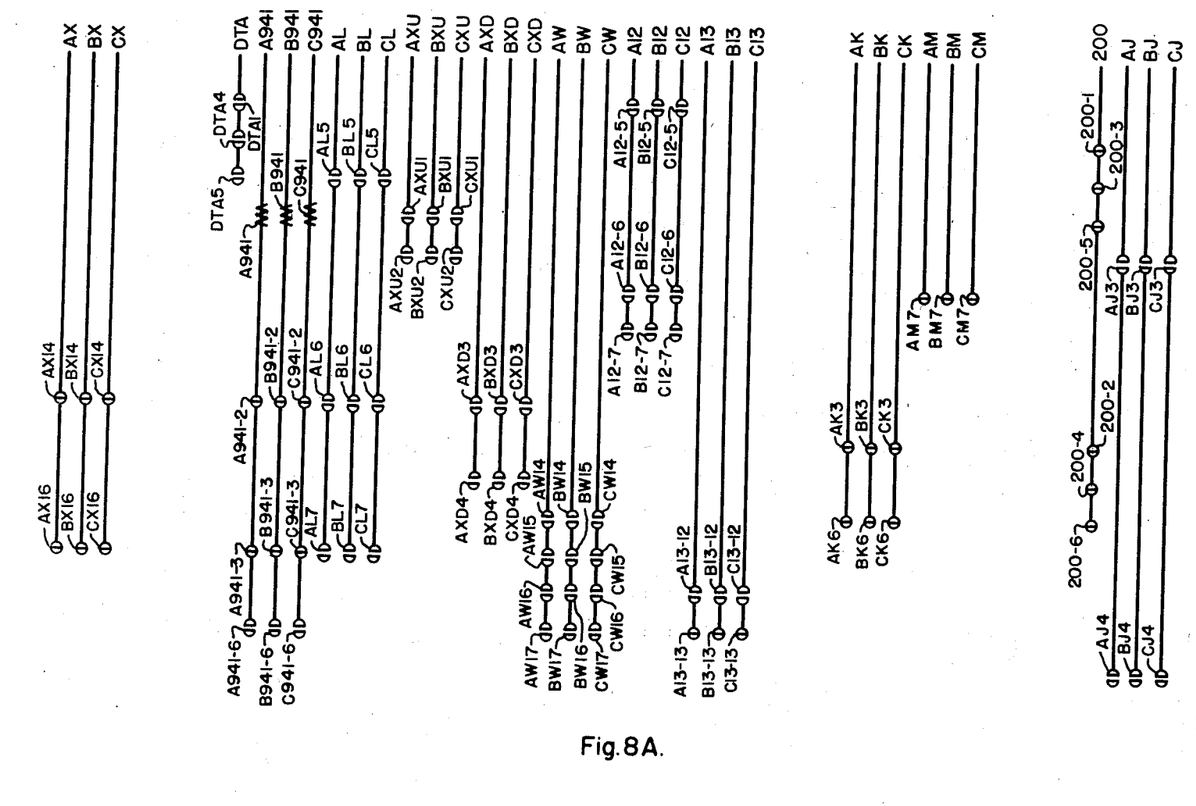

FIGURE 8

If the elevator car A is at the upper terminal landing the make contacts A12-5 of the upper terminal relay are closed. If, in addition, the elevator car A is selected as the next car to leave the upper terminal landing, the contact A5 of the stepping relay 5 is connected to the bus L+8. The contact A5 is operated by the stepping relay 5 in the manner set forth in the aforesaid Keiper et al. patent. Under these circumstances, the lamp AND is illuminated to indicate that the elevator car A is the next elevator car to leave the upper terminal landing and that the car should be loaded. The lamp AND may be a floor lantern at the upper terminal landing or a lamp in the car A.

Let it be assumed that the elevator car A is at the upper terminal landing and that it has been selected as the next elevator car to leave the upper terminal landing. If a dispatching interval has expired following the departure of the last elevator car to leave the upper terminal landing, the make contacts DTA1 of the down timing relay DTA close. If a car call is registered in the elevator car A the make contacts AL5 of the car call relay AL close. If a landing down call is registered from one of the landings of the building served by the elevator cars, the break contacts 200-1 of the relay 200 close. Thus, an energizing circuit for the lamp ASD is completed as follows:

L+8, A5, DTA1, 200-1 or AL5, ASD, A12-5, L—8

Illumination of this lamp, which may be located in the car, indicates that the elevator car attendant should start the elevator car away from the upper terminal landing. It should be noted that the make contacts DTA1 are not effective to energize the lamp ASD if the only call registered in the system is a landing up call.

If the elevator car A is on automatic operation the relay A941 is employed for controlling the starting of the elevator car. This relay is energized at the same time as the lamp ASD conveniently by connecting the relay in parallel with the lamp. When this relay is energized it closes its make contacts A941-6 to complete with the make contacts A12-5 a holding circuit for the relay. Consequently, the relay remains picked up until the elevator car A leaves the upper terminal landing. The departure of the elevator car is accompanied by opening of the make contacts A12-5 to deenergize the relay A941 and the lamp ASD.

If the elevator car A is at the upper terminal landing (make contacts A12-5 are closed) and if it is selected as the next elevator car to leave the upper terminal landing (contact A5 is connected to the bus L+8) a number of circuits other than those associated with the make contacts DTA1 control the departure of the elevator car. Thus if the elevator car B also is at the upper terminal landing (make contacts B12-6 are closed) or in the upper zone (make contacts BXU1 are closed) or if the elevator car C is at the upper terminal landing (make contacts C12-7 are closed) or in the upper zone (make contacts CXU2 are closed) a starting circuit is completed. Additional circuits are controlled by the positions of the elevator cars, the directions in which the elevator cars are set to travel, the starting conditions of the elevator cars and call registration. These additional circuits are best set forth in tabular form.

Under the assumed conditions, if any one of the items A, B or C under the following Group I is satisfied and in addition any one of the items A or B under the following Group II is satisfied, an energizing circuit is completed for the relay A941 and the lamp ASD.

DISPATCHING FROM UPPER TERMINAL FLOOR

Group I:
  A. Car B is in the lower terminal zone (make contacts BXD3 are closed)
  B. Car C is in the lower terminal zone (make contacts CXD4 are closed)
  C. Cars B and C are both set for up travel (make contacts BW14 and BW15 are closed)

Group II:
  A. Car B is set for up travel (break contacts BX14 are closed) and does not have a down start signal (break contacts B941-2 are closed) and either:
    1. A car call is registered for the car A (make contacts AL6 are closed) or
    2. A down floor call is registered (break contacts 200-2 are closed) and there is a floor call which is above the car C (break contacts CK3 are closed). Desirably this operation would respond only to a down floor call above the car C. However, the illustrated circuit is economical and provides satisfactory service.
  B. Car C is set for up travel (break contacts CX16 are closed) and does not have a down start signal (break contacts C941-3 are closed) and either:
    1. A car call is registered for the car A (make contacts AL7 are closed) or
    2. A down floor call is registered (break contacts 200-2 are closed) and a floor call exists which is above the car B (break contacts BK6 are closed).

Under certain conditions the elevator car A may be reversed during up travel at a landing below the upper terminal landing. Under such circumstances, the reversed relay AJ picks up in the manner set forth in the aforesaid Keiper et al. patent. Such pickup results in closure of the make contacts AJ3 and AJ4 of Fig. 8, and also results in the stopping of the elevator car at an intermediate landing in the manner set forth in the aforesaid Keiper et al. patent. As the elevator car stops, its direction of travel is reversed in the manner described in the Keiper et al. patent. In addition, the break contacts AM7 close to complete with the contacts AJ3 and AJ4 an energizing circuit for the lamp ASD and the relay A941. This assigns the elevator car A to start from the intermediate landing in the down direction. It will be understood that the break contacts AM7 are operated by the running relay AM of Fig. 1.

Figures 6, 7 and 8 show corresponding circuits for the elevator cars A, B and C which may be readily traced.

OPERATION

In considering the operation of the system, it will be assumed initially that the manually-operated switch ASW3 is in the position, illustrated in Fig. 1. Under such circumstances the car switch ASW is effective for controlling the operation of the elevator car A in precisely the same manner discussed in the aforesaid Keiper et al. patent. For this reason it should suffice to confine the discussion of the operation of the system to the effects of the modifications in operation introduced by the present invention. Let it be assumed first that the elevator car A is at the lower terminal landing (make contacts A13-6 in Fig. 7 are closed) and that it is selected as the next elevator car to leave the lower terminal landing (contact A6 is connected to the bus L+7). It is assumed further that the elevator car B is set for down travel (make contacts BX11 are closed) and that the elevator car B is adjacent the third landing (brush B50 engages contact segment Br3). Under such circumstances, the lower zone relay BXD is picked up and the make contacts BXD1 are closed. At this time it is assumed that a passenger or attendant in the elevator car A operates car button A5C (Fig. 6) to register a call for the fifth floor. Such an operation of the car button results in engerization of the car call relay AL and closure of the make contacts AL2. This completes the following starting circuit for the elevator car A:

L+7, A6, BXD1, AL2, AM4, ASU and A931 in parallel, A13–6, L—7

Consequently, the car attendant in the elevator car A is notified by the illumination of the lamp ASU that he should start his elevator car.

It should be noted that the instruction to start the elevator car A is obtained despite the fact that the elevator car B has not yet reached the lower terminal landing. This advance starting of the elevator car A has been found to decrease the standing time of the elevator system and thus to improve its efficiency.

A somewhat similar expedition of the starting of the elevator cars is obtained at the upper terminal landing. For example, let it be assumed that the elevator car A is at the upper terminal landing (make contacts A12–5 in Fig. 8 are closed) and that it is selected as the next elevator car to leave the terminal landing (contact A5 is connected to the bus L+8). It is assumed also that the elevator car B is set for up travel (make contacts BW11 are closed) and that the elevator car B is adjacent the fifth landing (brush B50 engages contact segment Br5). Under these circumstances the upper zone relay BXU is picked up and the make contacts BXU1 are closed to complete the following circuit:

L+8, A5, BXU1, A941 and ASD in parallel, A12–5, L—8

The illuminated lamp ASD advises the car attendant to start his elevator car A despite the fact that the elevator car B has not yet reached the upper terminal landing. Again this advanced starting of the elevator car A assists in decreasing the standing time of the elevator cars.

For the next sequence of operation, let it be assumed that the switch L30 (Fig. 6) is closed, that the elevator car A is at the first landing set for up travel, that the elevator car B is at the third landing set for up travel, and that the elevator car C is at the fourth landing set for up travel. Since these cars are all set for up travel, it follows that the down relays for these cars are all deenergized and the make contacts AX15, BX15 and CX15 are all open. Since these contacts are open, a decreased voltage is applied to the primary winding of the transformer L24 and from the preceding discussion it follows that the dispatching interval measured by the up timing relay UTA is increased. Consequently, a longer dispatching time must elapse before closure of the make contacts UTA1, UTA4 and UTA5 can assign another elevator car to leave the lower dispatching landing. This decreases the tendency of the elevator cars to bunch in the up direction.

It will be recalled that the make contacts UTA1 are effective only if an up landing call is registered (break contacts 100–1 are closed) or a car call is registered (make contacts AL1 are closed). The contacts UTA1 are ineffective if only a down landing call is registered. In a similar manner, the make contacts DTA1 are effective only if a down landing call is registered (break contacts 200–1 are closed) or a car is registered (make contacts AL5 are closed). The contacts DTA1 are ineffective if only an up landing call is registered. These features further decrease the probability of bunching of the elevator cars.

Let it be assumed next that the elevator car C is set for down travel at the fourth landing and that the elevator car A is selected as the next elevator car to leave the upper terminal landing. The elevator car B is assumed to be at the lower terminal landing set for up travel. At this instant, a down landing call is registered for the fifth floor. Such registration results in pickup of the landing down registering relay 5DR to open the break contacts 5DR3 and thereby deenergize the landing down call relay 200. This relay closes its break contacts 200–2. In addition, break contacts 5DR2 open (Fig. 5). Since the elevator car C is assumed to be adjacent the fourth landing, the opening of the break contacts 5DR2 deenergizes the landing call above relay CK and this results in closure of the break contacts CK3. Inasmuch as the elevator car B is set for up travel, the break contacts BX14 are closed. Also, the elevator car B does not have a down start signal and the break contacts B941–2 consequently are closed. Consequently, the contacts B941–2, BX14, CK3 and 200–2 are all closed. However, a circuit for energizing the start down relay A941 is not completed by these contacts for the reason that the elevator car B is set for up travel (make contacts BX11 are open) and the lower zone relay BXD consequently is deenergized and the make contacts BXD3 are open. In addition, the elevator car C is at the fourth landing which is above the lower zone of landings. Consequently, the lower zone relay CXD is deenergized and the make contacts CXD4 are open. Finally, the elevator car C is set for down travel and the make contacts CW15 of the up relay consequently are open.

When the elevator car C reaches the third landing the brush C50 engages the contact segment Cr3 to complete with the contacts CX11 an energizing circuit for the lower zone relay CXD. This relay now closes its contacts CXD4 to complete the following energizing circuit: L+8, A5, B941–2, BX14, CK3, 200–2, CXD4, A941 and ASD in parallel, A12–5, L—8. Consequently, the elevator car A now receives a start signal. By delaying this start signal until the elevator car C is in the lower zone, a fourth deterrent is provided against bunching of the elevator cars.

In the examples thus far discussed, it has been assumed that the elevator system is on attendant operation. The effect of operation of the manually-operated switch ASW3 to its upper position as viewed in Fig. 1 now will be considered. Such operation renders ineffective the car switch ASW.

The elevator cars continue to stop in precisely the same manner discussed in the aforesaid Keiper et al. patent. Let it be assumed that the elevator car A stops at the fifth landing. It will be recalled that the switch ASW4 is open while the car is at intermediate landings. As the elevator car comes to a stop, the make contacts AM3 of the running relay open and the delay relay A70T starts to time out. During the period required for the relay A70T to time out the elevator car doors can be opened and the passengers discharged or loaded as required.

To conserve space, doors for the elevator car are not illustrated. Ordinary conventional power-operated doors which automatically open as the elevator car comes to a stop and which automatically close when the elevator car is assigned to start may be employed. Alternatively, doors may be employed which are spring-biased to closed position and which are manually opened by the passengers after the elevator car comes to a stop at any landing.

At the expiration of its delay in dropout, which may be of the order of five seconds, the relay A70T drops out to close its break contacts A70T1. These contacts A70T1 shunt the switch ASW and its associated contact ASW1 and complete a starting circuit for the elevator car A in the same manner by which the operation of the car switch ASW previously completed a starting circuit.

As the elevator car A reaches a terminal landing the switch ASW4 closes to maintain the delay relay A70T energized. When the elevator car A is assigned to leave the terminal landing, one of the sets of make contacts A931–1 or A941–1 closes to establish a shunt around the car switch ASW and its contact ASW1. This starts the elevator car A in the same manner by which it was started previously through operation of the car switch ASW.

Although the invention has been described with reference to certain specific embodiments thereof, numerous modifications falling within the spirit and scope of the invention are possible.

We claim as our invention:

1. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, call registering means for registering calls for each of a plurality of the landings, control means for stopping each of the elevator cars at each landing approached by the elevator car for which a call is registered which may be served by the approaching elevator car, and start-initiating means responsive to a predetermined condition occurring while a first one of the elevator cars is set for travel towards the first terminal floor for assigning a second one of the elevator cars to start from the second terminal floor, said predetermined condition requiring call registration by the call registering means for a landing between the first one of the elevator cars and the second terminal landing and location of the first one of the elevator cars at any position in a predetermined zone containing a plurality of said landings adjacent to the first terminal landing and spaced from the second terminal landing by a plurality of landings.

2. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and start-initiating means responsive to a predetermined condition occurring while a first one of the elevator cars is set for travel towards the first terminal floor for assigning a second one of the elevator cars to start from the second terminal floor, said predetermined condition requiring call registration by the landing call registering means for a landing between the first one of the elevator cars and the second terminal landing and location of the first one of the elevator cars at any position in a predetermined zone containing a plurality of said landings adjacent to the first terminal landing and spaced from the second terminal landing by a plurality of landings.

3. In an elevator system for a structure having a first terminal landing, a second terminal landing spaced vertically from the first terminal landing and a plurality of vertically-spaced intermediate landings intermediate the terminal landings, a plurality of elevator cars, means mounting each of the elevator cars for vertical movement relative to the structure to serve the landings, call registering means for registering calls for each of a plurality of the landings, control means for stopping each of the elevator cars at each landing approached by the elevator car for which a call is registered which may be served by the approaching elevator car, dispatching means for dispatching successive ones of said elevator cars from the first terminal landing at timed intervals, and means responsive to the conditioning at the same time of a predetermined number of the elevator cars for travel towards the second terminal landing for altering the length of said intervals, said last-named means being effective for altering the length of said intervals while the elevator cars are displaced substantially from the first terminal landing.

4. In an elevator system for a structure having a first terminal landing a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, dispatching means for dispatching successive ones of said elevator cars from the first terminal landing with a time interval between each pair of successively-dispatched elevator cars, and means responsive to the conditioning of all of said elevator cars at the same time for movement towards the second terminal landing for increasing the magnitude of said time interval.

5. In an elevator system for a structure having a first terminal landing a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and dispatching means responsive to call registration by a first part only of the call registering means for dispatching successive ones of said elevator cars from the first terminal landing with a time interval between each pair of successively-dispatched elevator cars, said dispatching means being ineffective to dispatch one of the elevator cars in response to call registration by a second part only of the call registering means.

6. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and time dispatching means responsive to call registration by the landing-up-call registering means for dispatching successive ones of said elevator cars from the lower one of the terminal landings with a time interval between each pair of successively dispatched elevator cars, said time dispatching means being ineffective to dispatch said elevator cars in response to call registration by the landing-down-call registering means.

7. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and time dispatching means responsive to call registration by the landing-down-call registering means for dispatching successive ones of said elevator cars from the upper one of the terminal landings with a time interval between each pair of successively dispatched elevator cars, said time dispatching means being ineffective to dispatch said elevator cars in response to call registration by the landing-up-call registering means.

8. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and time dispatching means responsive to call registration by the car-call registering means for dispatching successive ones of said elevator cars from the first one of the terminal landings with a time interval between each pair of successively dispatched elevator cars, said time dispatching means being ineffective to dispatch said elevator cars in response to call registration by the landing-call registering means requiring travel towards the first terminal landing.

9. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and time dispatching means responsive to call registration by the landing-up-call registering means or by the car-call registering means of the car to be dispatched for dispatching successive ones of said elevator cars from the lower one of the terminal landings with a time interval between each pair of successively dispatched elevator cars, said time dispatching means being ineffective to dispatch said elevator cars in response to call registration by the landing-down-call registering means.

10. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, landing-up-call registering means for registering calls for each of a plurality of the landings in the up direction, landing-down-call registering means for registering calls for each of a plurality of the landings in the down direction, car-call registering means for each of the elevator cars for registering calls for landings desired by elevator car passengers, control means for stopping each of the elevator cars at each landing approached by the elevator car for which a call is registered which may be served by the approaching elevator car, and time dispatching means responsive to call registration by the landing-up-call registering means or by the car-call registering means of the car to be dispatched for dispatching successive ones of said elevator cars from the lower one of the terminal landings with a time interval between each pair of successively dispatched elevator cars, said time dispatching means being ineffective to dispatch said elevator cars in response to call registration by the landing-down-call registering means.

11. In an elevator system for a structure having a first terminal landing, a second terminal landing spaced vertically from the first terminal landing and a plurality of vertically spaced intermediate landings intermediate the terminal landings, a plurality of elevator cars, means mounting each of the elevator cars for vertical movement relative to the structure to serve the landings, dispatching means for dispatching a first one of said elevator cars from the first terminal landing, said dispatching means being ineffective until a second one of the elevator cars is located at any point in a zone of landings adjacent the second terminal landing, said zone including less than the full number of said landings.

No references cited.